US008667366B1

(12) United States Patent
de la Iglesia

(10) Patent No.: US 8,667,366 B1
(45) Date of Patent: Mar. 4, 2014

(54) EFFICIENT USE OF PHYSICAL ADDRESS SPACE FOR DATA OVERFLOW AND VALIDATION

(75) Inventor: Erik de la Iglesia, Sunnyvale, CA (US)

(73) Assignee: Violin Memory, Inc., Santa Clara, CA (US)

( * ) Notice: Subject to any disclaimer, the term of this patent is extended or adjusted under 35 U.S.C. 154(b) by 352 days.

(21) Appl. No.: 12/949,372

(22) Filed: Nov. 18, 2010

Related U.S. Application Data

(63) Continuation-in-part of application No. 12/759,604, filed on Apr. 13, 2010, now Pat. No. 8,417,871.

(60) Provisional application No. 61/170,472, filed on Apr. 17, 2009.

(51) Int. Cl.
*G11C 29/00* (2006.01)

(52) U.S. Cl.
USPC .......................................... 714/763; 714/758

(58) Field of Classification Search
USPC .................................................. 714/758, 763
See application file for complete search history.

(56) References Cited

U.S. PATENT DOCUMENTS

| | | | |
|---|---|---|---|
| 5,954,796 A | 9/1999 | McCarty et al. | |
| 6,041,366 A | 3/2000 | Maddalozzo et al. | |
| 6,175,906 B1 * | 1/2001 | Christie ......................... | 711/207 |
| 6,401,147 B1 | 6/2002 | Sang et al. | |
| 6,636,982 B1 | 10/2003 | Rowlands | |
| 6,678,795 B1 | 1/2004 | Moreno et al. | |
| 6,721,870 B1 | 4/2004 | Yochai et al. | |
| 6,742,084 B1 | 5/2004 | Defouw et al. | |
| 6,789,171 B2 | 9/2004 | Desai et al. | |
| 6,810,470 B1 | 10/2004 | Wiseman et al. | |
| 7,017,084 B2 | 3/2006 | Ng et al. | |
| 7,089,370 B2 | 8/2006 | Luick | |
| 7,110,359 B1 | 9/2006 | Acharya | |
| 7,516,264 B2 * | 4/2009 | Brittain et al. ..................... | 711/5 |
| 7,856,533 B2 | 12/2010 | Hur et al. | |
| 7,870,351 B2 | 1/2011 | Resnick | |
| 7,873,619 B1 | 1/2011 | Faibish et al. | |
| 7,975,108 B1 | 7/2011 | Holscher et al. | |
| 8,010,485 B1 | 8/2011 | Chatterjee et al. | |
| 2002/0035655 A1 | 3/2002 | Finn et al. | |
| 2002/0175998 A1 | 11/2002 | Hoang | |
| 2002/0191611 A1 * | 12/2002 | Benayoun et al. ............ | 370/392 |

(Continued)

OTHER PUBLICATIONS

Mark Friedman, Odysseas Pentakalos. Windows 2000 Performance Guide. File Cache Performance and Tuning [reprinted online]. O'Reilly Media. Jan. 2002 [retrieved on Oct. 29, 2012]. Retrieved from the internet: <URL:http://technet.microsoft.com/en-us/library/bb742613.aspx#mainSection>.

(Continued)

*Primary Examiner* — Guy Lamarre
(74) *Attorney, Agent, or Firm* — Brinks Gilson & Lione

(57) ABSTRACT

A storage access system stores block data into physical address blocks in a storage media. A last one of the physical address blocks that is either unfilled or only partially filled with the block data is used for storing extra data associated with the data blocks. A first portion of the last one of the physical storage blocks may be reserved for overflow data for different sizes of the block data. A second portion of the last one of the physical storage blocks may be used to store the validation information for the block data.

6 Claims, 10 Drawing Sheets

(56) References Cited

U.S. PATENT DOCUMENTS

| | | |
|---|---|---|
| 2002/0194434 A1 | 12/2002 | Kurasugi |
| 2003/0012204 A1 | 1/2003 | Czeiger et al. |
| 2003/0167327 A1 | 9/2003 | Baldwin et al. |
| 2003/0177168 A1 | 9/2003 | Heitman et al. |
| 2003/0210248 A1 | 11/2003 | Wyatt |
| 2004/0128363 A1 | 7/2004 | Yamagami et al. |
| 2004/0146046 A1 | 7/2004 | Jo et al. |
| 2004/0186945 A1 | 9/2004 | Jeter et al. |
| 2004/0215923 A1 | 10/2004 | Royer |
| 2005/0025075 A1 | 2/2005 | Dutt et al. |
| 2005/0195736 A1 | 9/2005 | Matsuda |
| 2006/0005074 A1 | 1/2006 | Yanai et al. |
| 2006/0034302 A1 | 2/2006 | Peterson |
| 2006/0053263 A1 | 3/2006 | Prahlad et al. |
| 2006/0075191 A1 | 4/2006 | Lolayekar et al. |
| 2006/0112232 A1 | 5/2006 | Zohar et al. |
| 2006/0212524 A1 | 9/2006 | Wu et al. |
| 2006/0218389 A1 | 9/2006 | Li et al. |
| 2006/0277329 A1 | 12/2006 | Paulson et al. |
| 2007/0050548 A1 | 3/2007 | Bali et al. |
| 2007/0079105 A1 | 4/2007 | Thompson |
| 2007/0118710 A1 | 5/2007 | Yamakawa et al. |
| 2007/0124407 A1 | 5/2007 | Weber et al. |
| 2007/0192444 A1 | 8/2007 | Ackaouy et al. |
| 2007/0233700 A1 | 10/2007 | Tomonaga |
| 2007/0283086 A1 | 12/2007 | Bates |
| 2008/0028162 A1 | 1/2008 | Thompson |
| 2008/0098173 A1 | 4/2008 | Chidambaran et al. |
| 2008/0104363 A1 | 5/2008 | Raj et al. |
| 2008/0162864 A1 | 7/2008 | Sugumar et al. |
| 2008/0215827 A1 | 9/2008 | Pepper |
| 2008/0215834 A1 | 9/2008 | Dumitru et al. |
| 2008/0250195 A1 | 10/2008 | Chow et al. |
| 2008/0320269 A1 | 12/2008 | Houlihan et al. |
| 2009/0006725 A1 | 1/2009 | Ito et al. |
| 2009/0006745 A1 | 1/2009 | Cavallo et al. |
| 2009/0034377 A1 | 2/2009 | English et al. |
| 2009/0110000 A1 | 4/2009 | Brorup |
| 2009/0240873 A1 | 9/2009 | Yu et al. |
| 2009/0259800 A1 | 10/2009 | Kilzer et al. |
| 2009/0262741 A1 | 10/2009 | Jungck et al. |
| 2009/0276588 A1 | 11/2009 | Murase |
| 2009/0307388 A1 | 12/2009 | Tchapda |
| 2010/0011154 A1 | 1/2010 | Yeh |
| 2010/0030809 A1 | 2/2010 | Nath |
| 2010/0058002 A1* | 3/2010 | Voll et al. ............... 711/154 |
| 2010/0080237 A1 | 4/2010 | Dai et al. |
| 2010/0088469 A1 | 4/2010 | Motonaga et al. |
| 2010/0115206 A1 | 5/2010 | de la Iglesia et al. |
| 2010/0115211 A1 | 5/2010 | de la Iglesia et al. |
| 2010/0122020 A1 | 5/2010 | Sikdar et al. |
| 2010/0125857 A1 | 5/2010 | Dommeti et al. |
| 2010/0169544 A1 | 7/2010 | Eom et al. |
| 2010/0174939 A1 | 7/2010 | Vexler |
| 2011/0047347 A1 | 2/2011 | Li et al. |
| 2011/0225364 A1* | 9/2011 | Edwards ............... 711/114 |
| 2011/0258362 A1 | 10/2011 | McLaren et al. |
| 2012/0198176 A1 | 8/2012 | Hooker et al. |
| 2013/0185526 A1* | 7/2013 | de la Iglesia et al. ......... 711/154 |

OTHER PUBLICATIONS

Stolowitz Ford Cowger Listing of Related Cases, Feb. 7, 2012.
Rosenblum, Mendel and Ousterhout, John K., The LFS Storage Manager. Proceedings of the 1990 Summer Usenix. 1990 pp. 315-324.

* cited by examiner

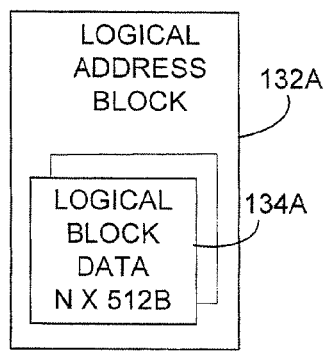
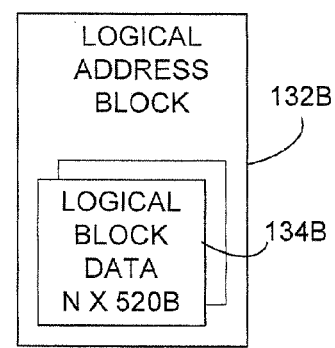
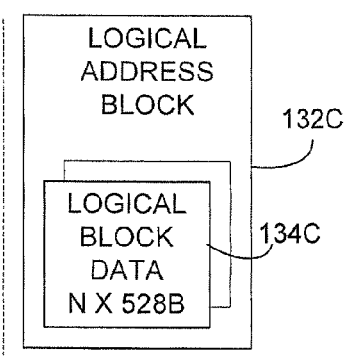
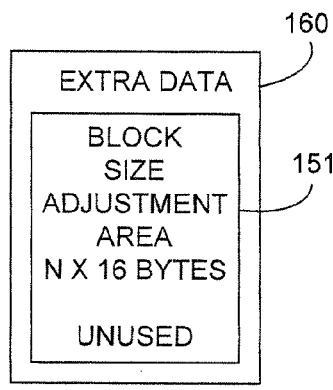
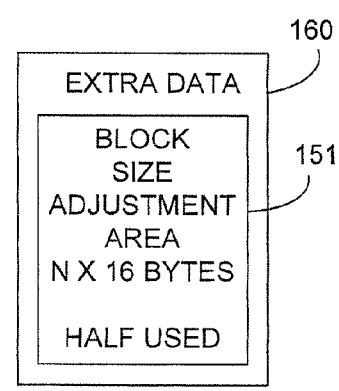
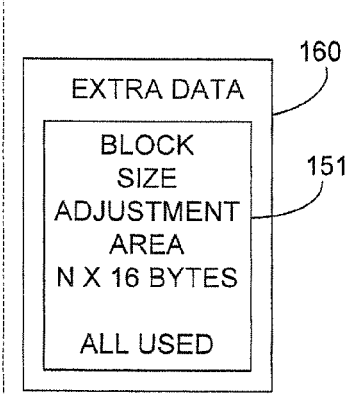
FIG. 6A  FIG. 6B  FIG. 6C

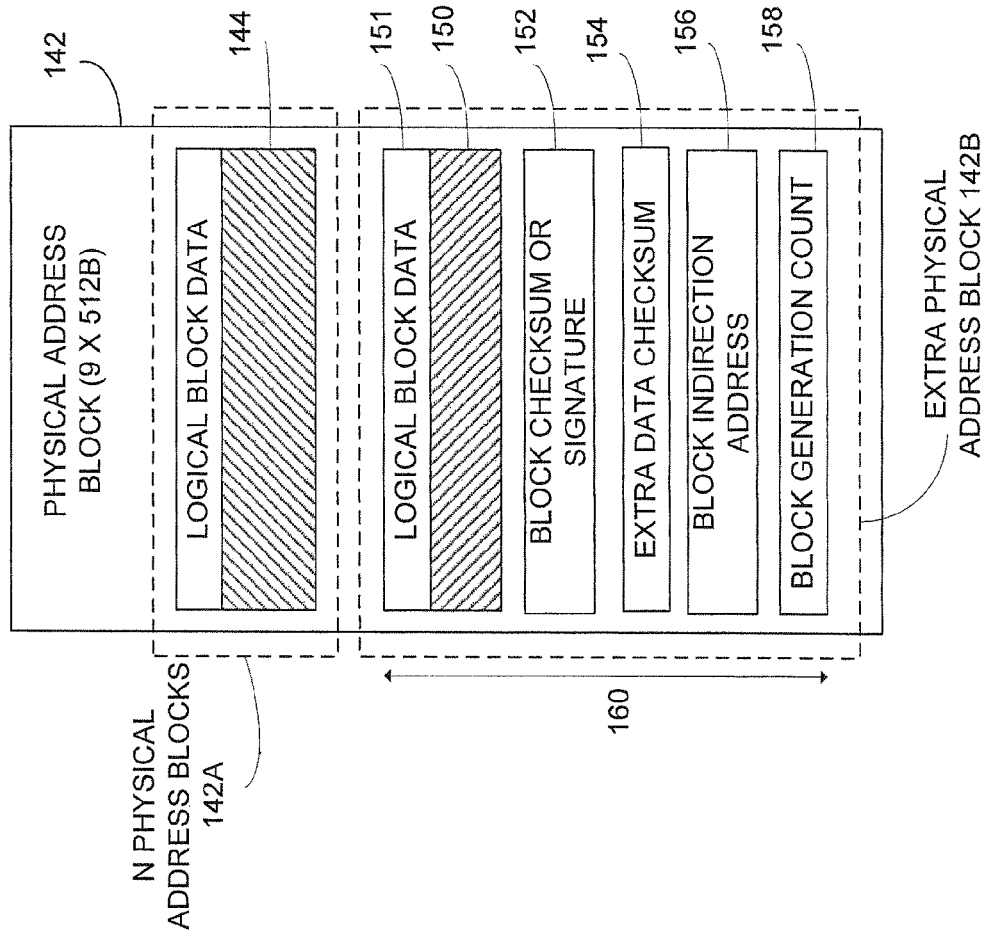
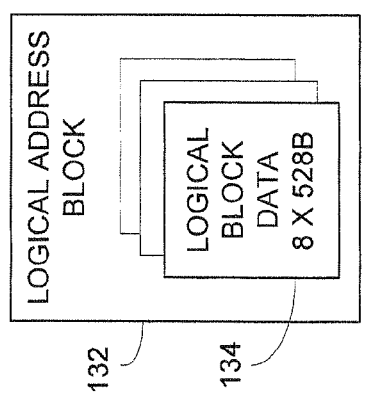
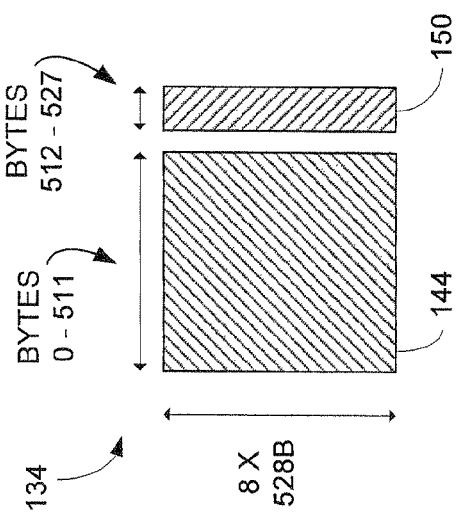

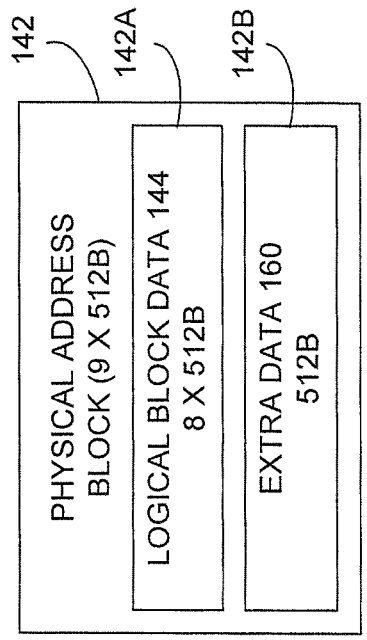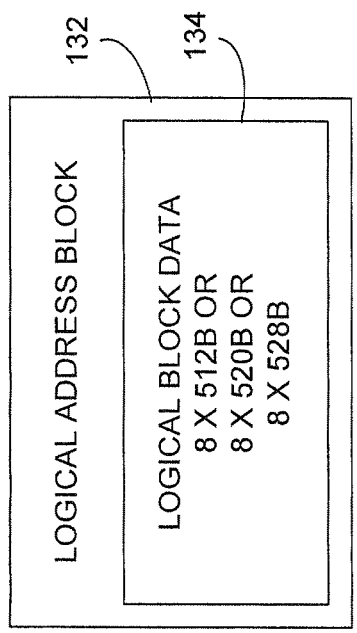
FIG. 8

EFFICIENT USE OF PHYSICAL ADDRESS SPACE FOR DATA OVERFLOW AND VALIDATION

This application is a continuation-in-part of, and claims priority to, co-pending application Ser. No. 12/759,604 entitled: SYSTEM FOR INCREASING STORAGE MEDIA PERFORMANCE, filed on Apr. 13, 2010, and which issued as U.S. Pat. No. 8,417,871 on Apr. 9, 2013, which claims priority to provisional application Ser. No. 61/170,472, filed on Apr. 17, 2009 which are incorporated by reference in their entirety.

BACKGROUND

Applications access data bases contained in large storage arrays. The storage arrays usually access data in 512 byte blocks. However, other high end enterprise applications might access the storage arrays in 520 or 528 byte block sizes. This allows the software applications to include a checksum or Cyclic Redundancy Check (CRC) with the data. Other systems may use 4 thousand byte (KB) block sizes for simpler data storage and addressing. In some systems, the application is a storage application executing within a storage system providing data integrity without the knowledge of applications using the storage system.

The storage array may include an array of rotating disks and/or an array of solid state disk drives. Rotating disk drives and Solid State Flash Disk (SSD) drives have certain problems. Due to a logical or physical fault, data may not be successfully stored in the storage device. However, the storage device may unknowingly indicate the write operation was successful. Because there is no indication of the write failure, the data is not rewritten into the storage device, not rewritten into another storage location, and no other accommodations are made for the write failure. This creates problems in subsequent read operations when the storage media unknowingly supplies outdated or corrupted versions of the data.

BRIEF DESCRIPTION OF THE DRAWINGS

FIGS. 6A-6C are block diagrams showing how some of the extra space is sized for different logical block data sizes.

FIGS. 7A-7C are block diagrams showing in more detail how extra block data and validation information is stored in the extra space of a physical address block.

FIG. 8 is a block diagram showing how some of the extra space is reserved for different logical block data sizes.

DETAILED DESCRIPTION

A storage access system manages storage accesses for different blocks sizes. The storage access system can also detect storage access failures and corrupted data in the storage media that would normally not be detectable.

Figure 1:
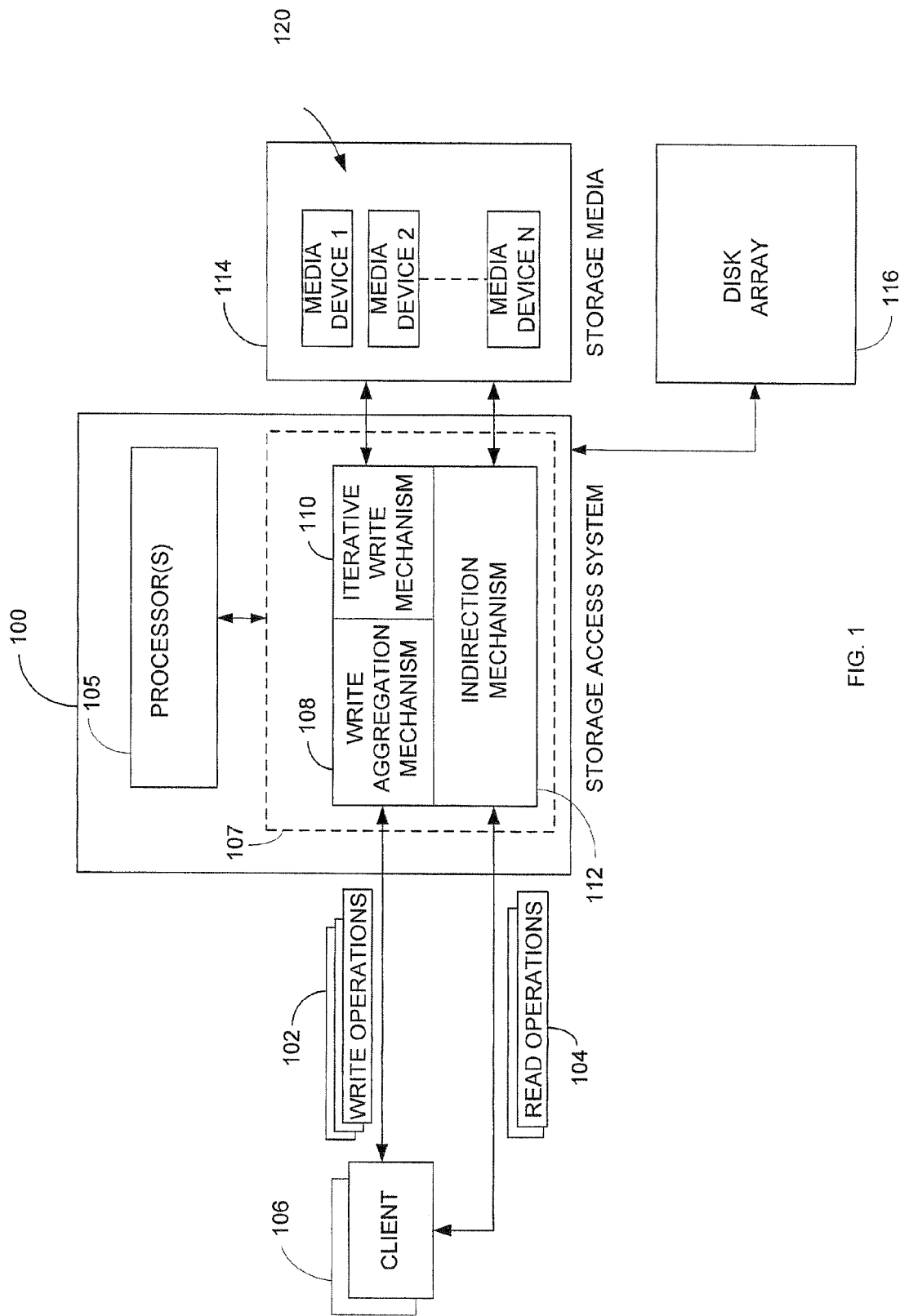
FIG. 1 is a block diagram of a storage access system.

FIG. 1 shows a storage access system 100 where data for client write operations are aggregated to improve the overall performance of write operations to a storage media. The storage access system 100 includes a write aggregation mechanism 108, iterative write mechanism 110, and an indirection mechanism 112. In one embodiment, the operations performed by the write aggregation mechanism 108, iterative write mechanism 110, and an indirection mechanism 112 are carried out by one or more programmable processors 105 executing software instructions located in a memory 107. In other embodiments, some operations in the storage access system 100 may be implemented in hardware and other elements implemented in software.

In one embodiment, a storage media 114 includes multiple different media devices 120 that are each separately read and write accessible by the storage access system 100. In one embodiment, the media devices 120 are flash Solid State Devices (SSDs) but could be or include any other type of storage device that may benefit from the aggregation and/or iterative storage schemes described below.

Client 106 comprises any application that accesses data in the storage media 114. For example, client 106 could comprise a software application in a database system that needs to read and write data to and from storage media 114 responsive to communications with users via a Wide Area Network or Local Area Network (not shown). The client 106 may also consist of a number of actual user applications or a single user application presenting virtual storage to other users indirectly. In another example, the client 106 could include software applications that present storage to a web application operating on a web server. The term "client" can refer to any software application and/or hardware that use the storage media 114 or an abstraction of this media by means of a volume manager or other intermediate device.

In one embodiment, the client 106, storage access system 100, and storage media 114 may all be part of the same appliance that is located on a server computer. In another example, any combination of the client 106, storage access system 100, and storage media 114 may operate in different computing devices or servers. In other embodiments, the storage access system 100 may be operated in conjunction with a personal computer, work station, portable video or audio device, or some other type of consumer product. Of course these are just examples, and the storage access system 100 can operate in any computing environment and with any application that needs to write and read date to and from storage media 114.

A disk array 116 may be thought of as any entity that receives and satisfies storage operations such as reads and writes to storage media. The disks or devices serving as disk array 116 may be local, remote or abstracted through another target in such a manner that the client 106 need only have knowledge of the disk array 116 to access the storage. Likewise, the client 106 may be thought of as any entity that issues storage operations.

The applications or servers using the disk array 116 may be abstracted or proxied (such as under an operation system or virtualized environment respectively) in such a manner that the disk array 116 only has knowledge of client 106. The disk array 116 could be located in the personal computer or server, or could also be a stand-alone device coupled to the client 106 via a computer bus or packet switched network connection.

The client 106 conducts different storage operations with the disk array 116 through the storage access system 100. The storage operations may include write operations 102 and read operations 104 that have associated storage addresses. These interactions with storage access system 100 and other components of storage access system 100 may be normalized to block-level operations such as "reads" and "writes" of an arbitrary number of blocks from an arbitrary storage address.

The storage access system 100 receives the write operations 102 from the client 106. The write aggregation mechanism 108 aggregates data for the multiple different write operations 102. For example, the write aggregation mechanism 108 may aggregate four megabytes (MBs) of data from multiple different write operations 102 together into a data block.

The indirection mechanism 112 writes the aggregated block data into the disk array 166 and may also determine which of the different media devices 120 in storage media 114 to store the block data. Physical addresses in the selected media devices 120 are then mapped by the indirection mechanism 112 with the client write addresses in the write operations 102. This mapping is necessary as a specific aggregated write occurs to a single address while the client writes can consist of multiple noncontiguous addresses. Each client write address can be mapped to a physical address which in turn is a sub-range of the address of the aggregated write.

In one embodiment, the iterative write mechanism 110 iteratively (and serially—or one at a time) writes the aggregated block data into the selected media devices 120. This iterative write process may use one media device 120 at a time and may store the same block data into multiple different media devices 120. Because the same data may be located in multiple different media devices 120 and only one media device 120 is written to at any one time, read operations 104 always have access to at least one of the media devices 120 for any data in storage media 114 without the chance of a concurrent write operation occurring to the same media device and blocking the read operation.

The storage access system 100 receives the read operations 102 from the client 106 that are directed to particular storage volumes for disk array 116. If data for a read request is currently stored in the storage media 114, the storage access system 100 provides the data from the storage media 114 back to the client 106. If the storage media 114 does not contain the requested data, the storage access system 100 forwards the read request to the disk array 116. The data obtained from disk array 116 is then forwarded back through the storage access system 100 to the client 106.

The read operation 104 may be received by the storage access system 100 while the iterative write mechanism 110 is iteratively writing data (serially) to multiple different media devices 120. The indirection mechanism 112 reads an address associated with the read operation 104 and then uses an indirection table in indirection mechanism 112 to determine where the data associated with the read operation 104 is located in the media devices 120.

If one of the identified media devices 120 is busy (currently being written to), the indirection mechanism 112 can access the data from a different one of the media devices 120 that also stores the same data. Thus, the read operation 104 can continue while other media devices 120 are concurrently being used for write operations and even other read operations. The access times for read operations 104 are normalized since the variable latencies associated with write operations 102 no longer create bottlenecks for read operations 104.

Figure 2:
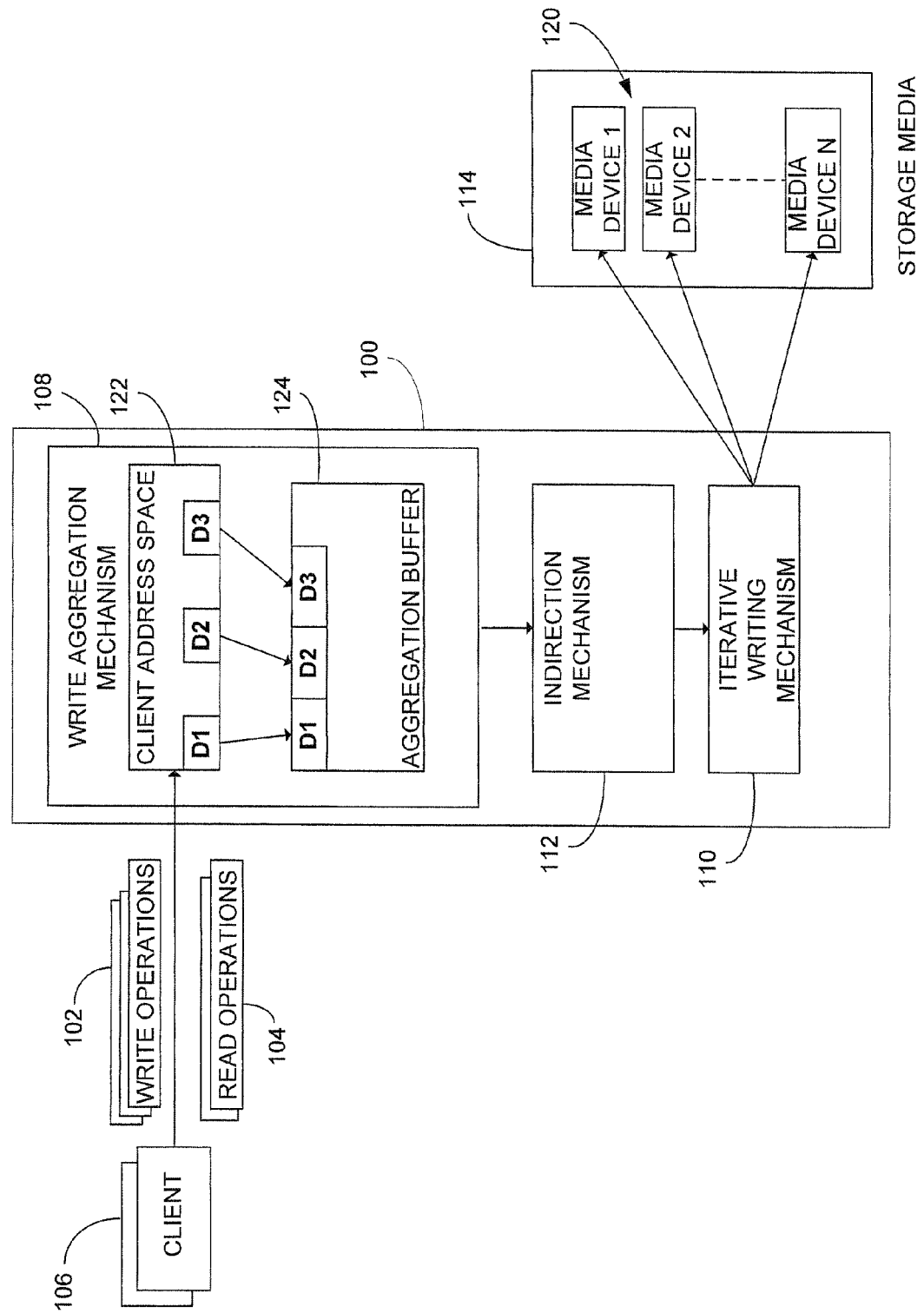
FIG. 2 is a block diagram showing the storage access system of FIG. 1 in more detail.

FIG. 2 describes the operation of the write aggregation mechanism 108 in more detail. The write aggregation mechanism 108 receives multiple different write operations 102 from client 106. The write operations 102 include client addresses and associated data D1, D2, and D3. The client addresses provided by the client 106 in the write operations 102 may be random or sequential addresses.

The write aggregation mechanism 108 aggregates the write data D1, D2, and D3 into an aggregation buffer 124. The data for the write operations 102 may be aggregated until a particular amount of data resides in buffer 124. For example, the write aggregation mechanism 108 may aggregate the write data into a 4 Mega Byte (MB) buffer. As described in further detail below, the write aggregation mechanism 108 may also aggregate and allocate additional space in the aggregation buffer 124 for variable size write operations and for storing validation data.

The indirection mechanism 112 identifies media devices 120 within the storage media 114 for storing the data in the aggregation buffer 124. In another embodiment, aggregation occurs until either a specific size has been accumulated in buffer 124 or a specified time from the first client write has elapsed, whichever comes first.

At least some examples of how the indirection mechanism 112 aggregates data for random write operations into a data block and writes the data into media devices 120 is described in co-pending patent application Ser. No. 12/759,644 that claims priority to co-pending application Ser. No. 61/170,472 entitled: STORAGE SYSTEM FOR INCREASING PERFORMANCE OF STORAGE MEDIA, filed Apr. 17, 2009 which is incorporated by reference in their entirety.

Aggregating data for multiple write operations into a single contiguous write operation can reduce the overall latency. For example, flash SSDs can typically read a contiguous set of data faster than random reads for the same amount of data. Therefore, aggregating multiple writes operations into contiguous block data can reduce the overall access time required for subsequent read operations to storage media 114. By performing a single write operation instead of one write per client write, the total time required to write all client data is also reduced.

Variable Storage Access Sizes and Data Storage Failures

As explained above, client 106 may use different storage access block sizes. For example, client 106 in a first system may read and write data a 512 byte logical block. Clients 100 in other storage systems may read and write data in 520 byte, 528 byte, or 4 KB logical blocks.

As also mentioned above, the storage media 120 may unknowingly experience storage failures or data corruption. For example, the storage access system 100 may issue a write operation 102 to storage media 114. Due to a logical or physical fault in one of the media devices 120, the storage media 114 might not successfully store the data associated with the write operation 102. The control logic in the storage media 114 might not detect the storage failure and inadvertently indicate back to the storage access system 100 that the write operation was successful. Unbeknown to the storage media 114, the data in the media devices 120 could also become corrupted and unknowingly provide the corrupted data back to the storage access system 100. The storage access system 100 would then unknowingly provide the bad data from the storage media 114 to the client 106.

Figure 3:
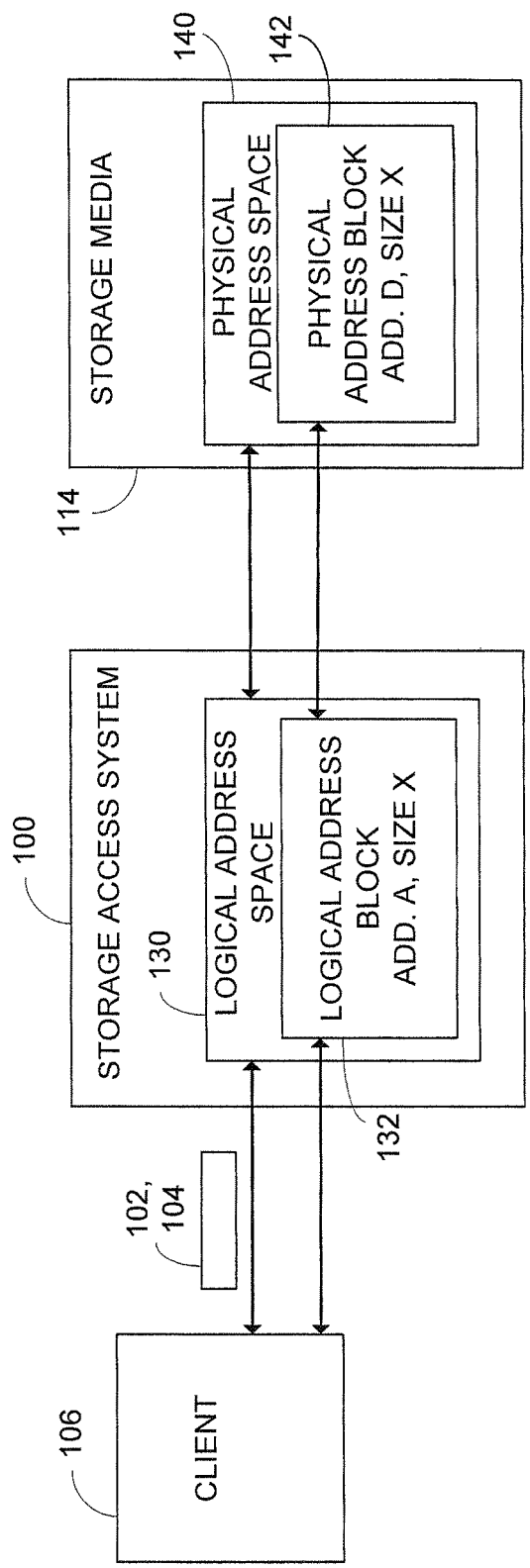
FIG. 3 is a block diagram showing different logical and physical address spaces used by the storage access system.

FIG. 3 shows different addressing spaces associated with a storage operation. A logical address space 130 represents the addresses used by the client 106 in conjunction with storage access requests 102 and 104. The same logical address space 130 may also be used by the storage access system 100 when forwarding storage access requests to the storage media 114. A physical address space 140 represents the address used by the storage media 114 for accessing physical address blocks.

For example, the client 106 may send one or more write operations 102 to the storage access system 100. The data associated for one or more of the write operations 102 may be aggregated into a logical address block 132. The logical address block has an associated logical address A and a block size X. The storage access system 100 sends a write request to the storage media 114 that includes the data for logical address block 132 and address A. The storage media 114 identifies a physical address block 142 at a physical address D for storing the data associated with the write operation 102. The logical address A could be the same as the physical address D. But in other cases, the storage media 114 maps the logical address A to a different physical address D within the storage media 114.

In some storage systems the logical address block 132 is the same size as the physical address block 142. For example, the client 106 may access data in 512 byte blocks and the storage media 114 may also be configured to access data in 512 byte blocks 142. This is represented in FIG. 3 with the logical address block 132 and the physical address block 142 having a same block size of X.

Figure 4:
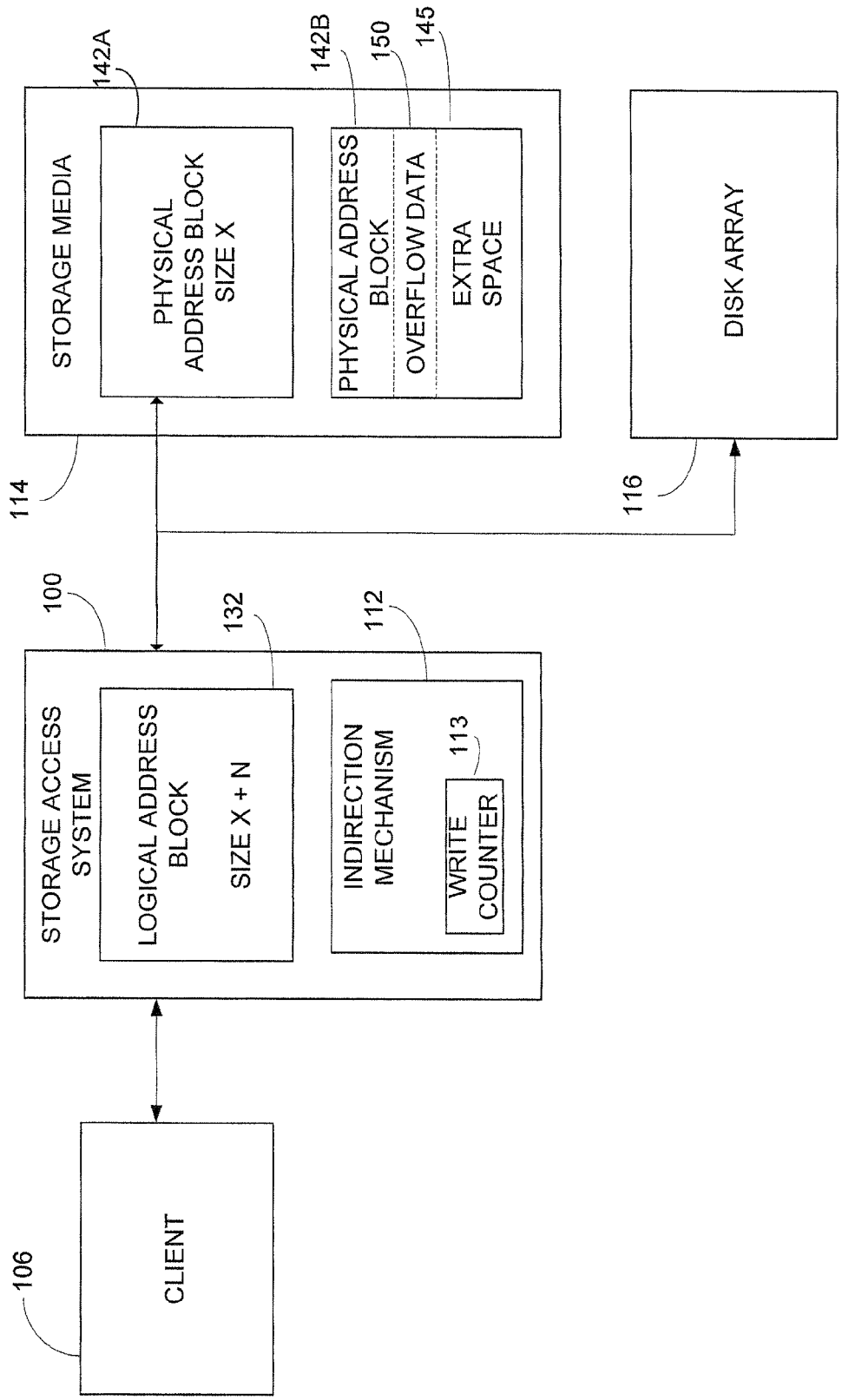
FIG. 4 is a block diagram showing how extra space in a physical address block is used to store overflow data.

FIG. 4 shows another embodiment where the logical address block 132 used by the client 106 is a different size than the physical address block 142 used by storage media 114. As mentioned above, the client 106 may access data in a variety of different block sizes. For example, the client 106 may access data in 520B, 528B, or 4 KB blocks. This is represented in FIG. 4 by logical address block 132 that has a block size of X+N. However, the storage media 114 may only be able to access physical address blocks 142 of one block size X.

To accommodate logical address blocks 132 larger than size X, the storage media 114 stores the data for logical address block 132 in two physical address blocks 142A and 142B. The first physical address block 142A stores the first X bytes of the data for logical address block 132 and the physical address block 142B stores the remaining overflow data 150 for logical address block 132. For example, the logical address block 132 may have a size of 520 bytes and the physical address blocks 142A and 142B may sizes of 512 bytes. The 8 additional bytes of data for the logical address block 132 are stored as overflow data 150 in physical address block 142B.

If the storage media 114 can only access data in 512 bytes blocks, the extra 8 bytes of overflow data 150 still has to be stored in a 512 byte physical address block 142B. Thus, the overflow data 150 may only use a relatively small portion of the available address space in physical address block 142B.

The storage access system 100 utilizes the remaining extra space 145 in the physical address block 142B to store the overflow data 150 for multiple logical address blocks 132 and to validate the data read from the physical address blocks 142. The validation ensures that write operations to the physical address blocks 142A and 142B are successful and not corrupted.

Figure 5:
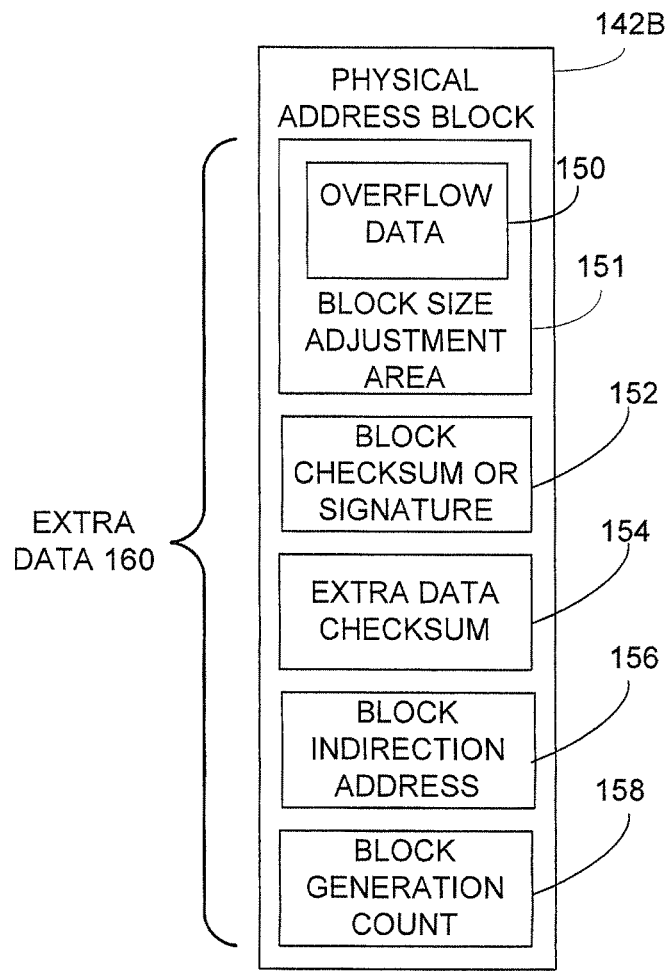
FIG. 5 is a block diagram showing how validation information is stored in the extra space.

FIG. 5 shows extra data 160 that may be stored in physical address block 142B. The overflow data 150 is stored in a block size adjustment area 151. If the logical address block 132 in FIG. 4 are the same size as the physical address blocks 142, then no overflow data 150 needs to be stored in the block size adjustment area 151. However if the logical address blocks 132 are for example 528 bytes and the physical address blocks 142 are 512 bytes, 16 bytes of overflow data 150 from the logical address block 132 is stored in block size adjustment area 151. The block size adjustment area 151 is sized large enough to hold the largest possible amount of overflow data 150 for any of the different possible sizes used by the client 106 for logical address block 132.

Still referring to FIGS. 4 and 5, a block checksum or signature 152 for the data in the logical address block 132 is stored in another portion of the physical address block 142B. The checksum or signature 152 may only be for the data stored in physical address block 142A or may be for the data stored in physical address block 142A and the overflow data 150 stored in physical address block 142B. The checksum or signature 152 is used to confirm that the data associated with logical address block 132 is successfully stored in the storage media 114 and not uncorrupted. Any conventional checksum or signature generation scheme known to those skilled in the art can be used.

An extra data checksum 154 is a checksum for the extra data 160 stored in physical address block 142B. The extra data checksum 154 verifies that the overflow data 150, block checksum 152, a block indirection address 156, and a block generation count 158 are successfully stored in physical address block 142B and have not been corrupted.

The block indirection address 156 contains the address associated with logical address block 132. For example, the client 106 may send a write command that includes the data in logical address block 132 and an address A. The indirection mechanism 112 may map the address A for the logical address block 132 to another address D associated with a physical address block 142. The indirection mechanism 112 writes the data for the logical address block 132 into the physical address block 142 at address D.

The indirection mechanism 156 stores the address A associated with the logical address block 132 into the physical address block 142B as block indirection address 156. The client 106 may send a subsequent read operation to the storage access system 100 for the logical address block 132 at address A. The data in physical address blocks 142A and 142*b* is then read back from the storage media 114. The storage access system 100 and/or client 106 can then use the block indirection address 156 to confirm the correct data was read from the storage media 114. For example, if the block indirection address 156 does match read address A, then either the storage access system 100 or the storage media 114 mapped the address for the read operation to the wrong physical address block 142 in storage media 114.

The block generation count 158 identifies the number of times data associated with a particular logical address block 132 is written into the storage media 114. For example, the client 106 may send a write operation 102 for address A to the storage access system 100. The indirection mechanism 112 in FIG. 4 increments a write counter 113 each time the logical address block 132 associated with address A is written to storage media 114. The value in write counter 113 is referred to as the block generation count 158 and is stored along as the other extra data 160 in the physical address block 142B.

The indirection mechanism 112 uses the block generation count 158 to confirm success of the write operation in storage media 114. For example, the client 106 may send a subsequent read operation to the storage access system 100. The storage access system 100 reads the data in physical address blocks 142A and 142B. The indirection mechanism 112 then compares the value of write counter 113 with the value of block generation counter 158. A block generation count 158 one less than the value of write counter 113 indicates the previous write operation failed in storage media 114. Thus, the block generation count 158 is used to identify silent write failures in the storage media 114. This is also explained below in FIGS. 9 and 10.

As explained above, data from a client write operation 102 may be stored both in the storage media 114 and the storage array 116. A write failure or corrupted data may be detected in the storage media 114 based on any incorrect validation information 152, 154, 156, or 158. Responsive to the failure, the storage access system 100 can read the same data back from disk array 116. The storage access system 100 can then supply the data from disk array 116 to the client 106 and possibly try to rewrite the data from disk array 116 back into storage media 114.

Any combination of the overflow data 150, block checksum 152, extra data checksum 154, block indirection address 156, and/or block generation count 158 may be contained in extra data 160. The data and information actually used in extra data 160 can vary according to the configuration of client 106 and storage media 114, and any particular storage system requirements.

FIGS. 6A-6C show examples of how the block size adjustment area 151 in FIG. 5 is used by the indirection mechanism 112 for different logical block sizes. FIG. 6A shows a logical address block 132A comprised of N×512 bytes of data 134A. The block size adjustment area 151 in the extra data 160 is allocated to hold up to 16 bytes of overflow data 150 for N blocks of data 134A. The 16 byte value is selected to accommodate clients 106 that use logical block data 134 of any size up to 528 bytes. Of course, the block size adjustment area 151 could also be configured for other logical block data sizes. Since the individual logical block data 134A in FIG. 6A is 512 bytes, the block size adjustment area 151 in extra data 160 is unused. This is because each of the 512 byte logical block data 134A can be stored in one of the 512 byte physical address blocks 142A in the storage media 114 shown in FIG. 4.

In FIG. 6B, the logical address block 132B formed by the indirection mechanism 112 is comprised of N×520 bytes of logical block data 134B received from the client 106. Since the physical address blocks 142 in FIG. 4 are each 512 bytes, the logical block data 134B received from client 106 each have 8 bytes of overflow data 150. As explained in FIG. 6A, the block size adjustment area 151 is configured to store up to 16 bytes of overflow data 150 for N number of logical block data 134B. Therefore, only half of the block size adjustment area 151 is used for storing overflow data 150 for the data associated with logical address block 132B.

In FIG. 6C, the logical address block 132C comprises N×528 bytes of logical block data 134C. Therefore, each logical block data 134C has 16 bytes of overflow data 150. The capacity of the block size adjustment area 151 is N×16 bytes. Therefore, all of the block size adjustment area 151 is used for storing the overflow data 150 for the logical address block 132C.

FIGS. 7A-7C show in more detail one example of how the indirection mechanism 112 stores the blocks of data 134 associated with the logical address block 132 into the storage media 114. FIG. 7A shows an example where the logical address block 132 comprises 8 blocks of data 134 that are each 528 bytes. A first 8×512 byte portion 144 of the block data 134 is shown in FIG. 7B. A second 8×16 byte portion 150 of the logical block data 134 is also shown in FIG. 7B.

FIG. 7C shows a physical address block 142 having a size of 9×512 bytes. Eight of the 512 byte physical address blocks 142A store the first portion 144 of the logical block data 134. A ninth one of the 512 byte physical address blocks 142B stores the extra data 160. The extra data 160 includes the overflow data 150 from logical block data 134 that exceeds the 8×512 size of the first 8 physical addressable blocks 142A.

Only 8×16=128 bytes of the 512 byte physical address block 142B is filled with overflow data 150. The additional 368 bytes of the extra physical address block 142B are used for storing any combination of the validation information that includes block checksum or signature 152, extra data checksum 154, block indirection address 156, and block generation count 158. The validation information is calculated by the indirection mechanism 112 and then stored along with the overflow data 150 in the physical address block 142B.

Other logical block ratios can also be used based on the space needed for the overflow data 150 and validation information 152, 154, 156, and 158. For example, the logical address block 132 may be 16×528 bytes. Sixteen of the physical address blocks 142A store 16×512 bytes of the logical block data 134 and the extra N+1 physical address block 142B stores the extra data 160 that includes the overflow data 150 and validation data for the 16×528 logical block data 134. At least in one embodiment, the indirection mechanism 112 is configured to use as much of the space in the extra physical address block 142B as possible by adjusting the size of the logical address block 132.

FIG. 8 shows an alternate view of the logical address block 132 where the logical block data 134 can either be 8×512 bytes, 8×520 bytes, or 8×528 bytes. As explained above, 8×512 bytes of the data is stored in the first 8×512 physical address blocks 142A. The extra data 160 is stored in the ninth physical address block 142B. There is enough capacity in the physical address block 142B for storing the overflow data 150 for any of the three logical block data sizes 134 used by the client 106.

The client 106 may issue a subsequent read operation for logical block data 134. The storage access system 100 reads the entire physical block 142 that includes the logical block data 144 and the extra data 160. The storage media 114 may use relatively fast flash memory or other relatively fast media devices. In addition, it may be just as fast to access nine contiguous physical address blocks 142 as two randomly addressed physical address blocks 142. Thus, the time required to read the extra data 160 from storage media 114 may not add any delay to client memory access times. In most storage technologies, the penalty for reading small ranges of data from a disk are dominated by a compulsory access time of a "random seek" rather than the exact size of the transfer.

In another embodiment the storage media 114 may have an optimal access time associated with a particular block size. For example, the media devices 120 in the storage media 114 in FIG. 1 may have an optimal storage access time with 4 KB block sizes. In order to minimize data access times, the indirection mechanism 114 may be configured to store data in storage media 114 in 5×512 byte physical blocks 142 instead of 9×512 byte physical blocks. The associated reduction in storage efficiency (overhead of 1 block for every 4 logical blocks vs. 1 block for every 8 logical blocks in the previous example) may be a reasonable price in order to achieve superior read performance.

In another embodiment, the media devices 120 in the storage media 114 may have the same storage access time for 4 KB and 8 KB block sizes. In order to use space in the physical address block 142B more efficiently, the indirection mechanism 114 may alternatively be configured to aggregate 9×512 bytes of logical block data 134 instead of 5×512 bytes of logical block data 134.

The storage access system 100 can also read individual physical address blocks 142A or 142B associated with a particular read operation from client 106. However, since sequential reads to storage media 114 may be faster than random reads, it may be faster to perform one sequential memory access read of the entire physical address block 142 regardless of the amount of data requested in the client read operation.

The indirection mechanism 112 uses a direct mapping that associates every logical address block 132 with an N+1 physical address blocks 142. The logical address block 132 can also be a relatively large size, such as 512 Kbytes. In this example, sub-portions of the 512 KB logical address block 132 may have associated extra data 160 in different 512 byte physical blocks 142B. The 512 KB physical address block 142 is read from the storage media 114. The individual sub-portions of the 512 KB physical address block 142 are then separately validated by the indirection mechanism 112 using the extra data 160 read from the associated physical address blocks 142B.

Figure 9:
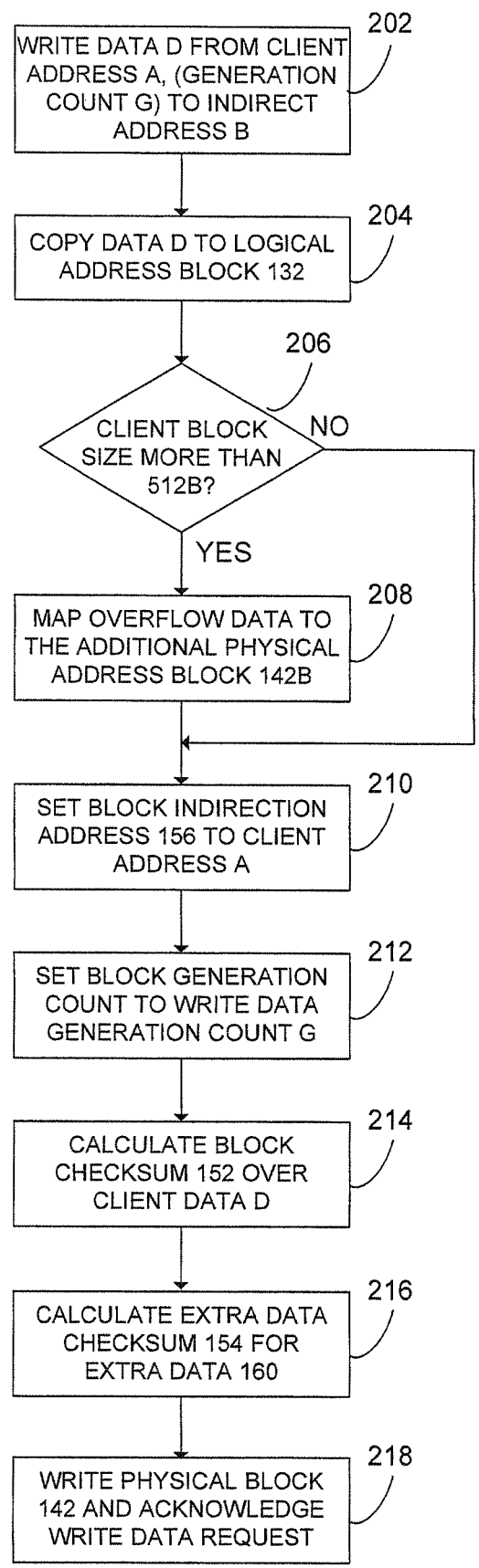
FIG. 9 is a flow diagram showing how a write operation is performed by the storage access system.

FIG. 9 explains the write operations performed by the indirection mechanism 112 in FIG. 1 in more detail. As explained above, the write aggregation mechanism 108 in FIG. 1 aggregates the data for one or more client write operations into a single data block. This allows the indirection mechanism 112 to conduct one large sequential write operation to the storage media 120. This may allow faster data access times to the storage media 114 than random address access operations.

In operation 202 the indirection mechanism 112 receives data D with associated address A from the client 106. The indirection mechanism 112 identifies an indirect address B in the storage media 114 for storing data D. The current value of the write counter 113 in the indirection mechanism 112 associated with address A is incremented to the value G.

In operation 204 the indirection mechanism 112 stores the data D received from client 106 in aggregation buffer 124 in FIG. 2 forming logical address block 132. The indirection mechanism 112 in operation 206 determines if the size of individual the logical block data 134 in logical address block 132 is more than 512 bytes. The overflow portion 150 of the physical data block 134 greater than 512 bytes in aggregation buffer 124 is mapped to the extra physical address block 142B.

In operation 210 the indirection mechanism 112 writes the client address A into the location of the aggregation buffer 124 associated with the block indirection address 156. In operation 212 the block generation count G in write counter 113 in FIG. 4 associated with client address A is written into the aggregation buffer 124. In operation 214 the checksum for the client data D is calculated and stored in the location of aggregation buffer 124 associated with the block checksum 152. This may be a checksum for all of logical block data 134 or may only include the N×512 byte portion 144 of the logical block data 134.

The indirection mechanism in operation 216 calculates and stores the checksum for the extra data 160 as extra data checksum 154 in the aggregation buffer 124. The extra data checksum 154 may be calculated for all of the extra data 160 including the overflow data 150, or may only be calculated for the validation information 152, 156, and 158. The indirection mechanism 112 in operation 218 copies the contents of the aggregation buffer 124 into the physical address block 142 in the storage media 114 associated with address B. A write acknowledge is then received back from the storage media 114.

Figure 10:
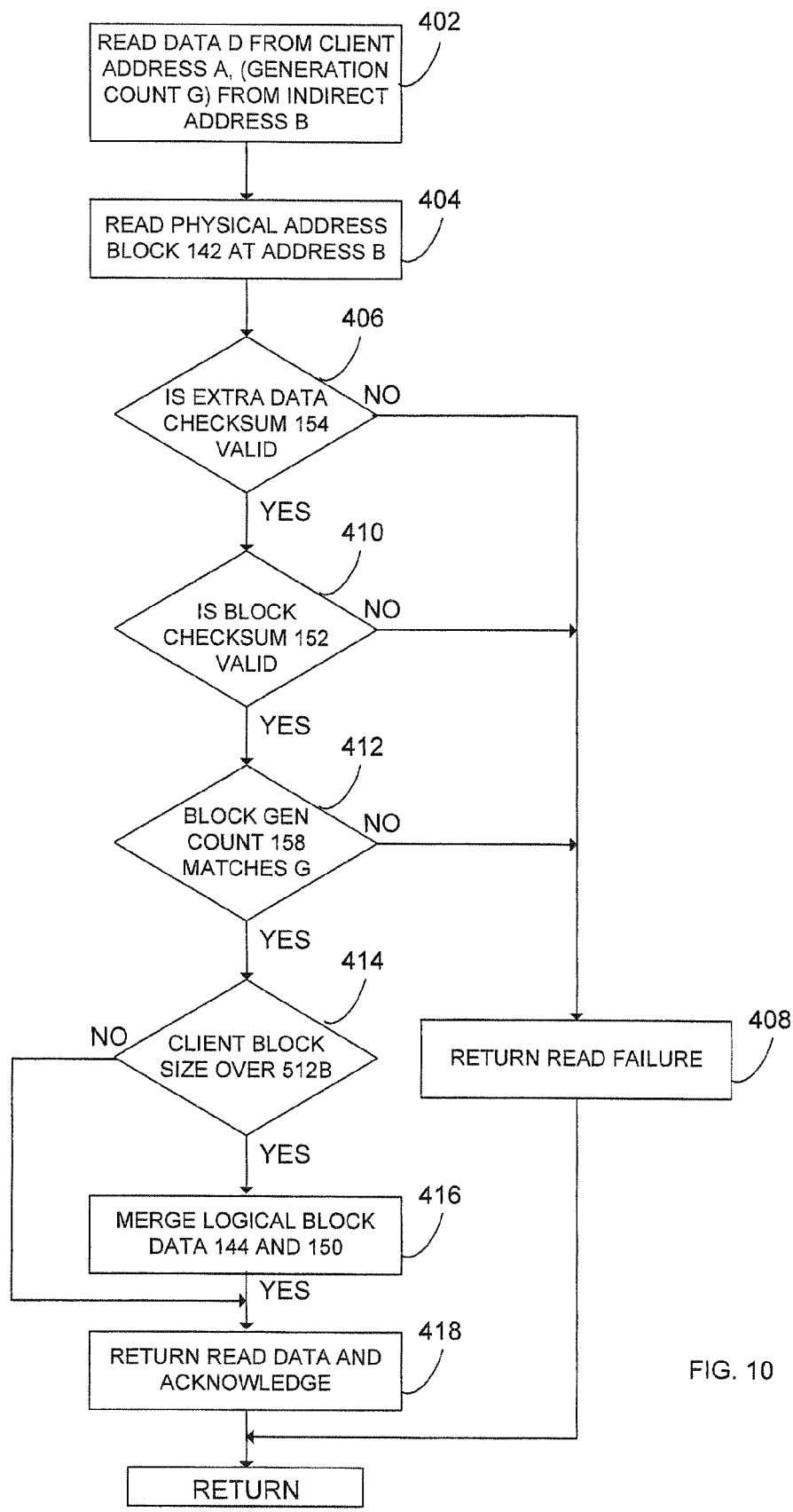
FIG. 10 is a flow diagram showing how a read operation is performed by the storage access system.

FIG. 10 describes in more detail how the indirection mechanism 112 performs a read operation. The indirection mechanism 112 in operation 402 receives a read request 104 from the client 106 that identifies address A. The indirection mechanism 112 identifies the value for the write counter 113 and the indirection address in the storage media 114 associated with address A. In this example, the write counter 113 has a generation count of G and the indirection address is B. In operation 404 the indirection mechanism 112 reads the physical address block 142 at address B in storage media 114. The physical address block 142 includes the logical block data 134 in FIG. 4 and any other extra data 160.

Indirection mechanism 112 generates a checksum for the extra data 160 and compares it with the extra data checksum 154 read from storage media 114. If the two checksums match, the extra data 160 is considered valid in operation 406. If the two checksums do not match, the indirection mechanism 112 returns a read failure in operation 408. The indirection mechanism 112 may initiate any number of actions responsive to a read failure 408. For example, the physical address block 142 may be read from disk array 116 in FIG. 4, a read failure message sent to the client 106, etc.

The indirection mechanism 112 generates a checksum or signature for the logical block data 134 read from storage media 114 and compares the checksum or signature with the block checksum or signature 152 read from storage media 114. If the two checksums or signatures match, the logical block data 134 is considered valid. If the checksums or signatures do not match, a read failure is returned in operation 408.

The count value G identified in write counter 113 is compared with the block generation count 158 read from storage media 114. As explained above, the previous write operation is determined to be successful when the both write counts have the value G. Otherwise, a read failure is returned in operation 408. A read failure in operation 412 may indicate a previous silent write failure in the storage media 114 that prevented the write count G from being successfully stored in physical block 142.

If the validation operations 406, 410, and 412 are all successful, the block data 134 is considered valid. In operation 414, the indirection mechanism 112 determines if the size of logical block data 134 is over 512 bytes. If the client block size is over 512 bytes, the block data 144 read from the physical address block 142 is merged with the extra data 150 in operation 416. The data associated with address A is sent to the client 106 and the redirection mechanism 112 receives back an acknowledgement in operation 418.

The storage access system 100 is adaptable to handle variable block size client storage access requests. Any overflow data can be combined with other validation information for more efficient use of storage space. Thus, the validation information increases reliability of the data provided to client 106 without negatively effecting storage access times.

Hardware and Software

Several examples have been described above with reference to the accompanying drawings. Various other examples are also possible and practical. The systems and methodologies may be implemented or applied in many different forms and should not be construed as being limited to the examples set forth above. Some systems described above may use dedicated processor systems, micro controllers, programmable logic devices, or microprocessors that perform some or all of the operations. Some of the operations described above may be implemented in software or firmware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Digital Processors, Software and Memory Nomenclature

As explained above, embodiments of this disclosure may be implemented in a digital computing system, for example a CPU or similar processor. More specifically, the term "digital computing system," can mean any system that includes at least one digital processor and associated memory, wherein the digital processor can execute instructions or "code" stored in that memory. (The memory may store data as well.)

A digital processor includes but is not limited to a microprocessor, multi-core processor, Digital Signal Processor (DSP), Graphics Processing Unit (GPU), processor array, network processor, etc. A digital processor (or many of them) may be embedded into an integrated circuit. In other arrangements, one or more processors may be deployed on a circuit board (motherboard, daughter board, rack blade, etc.). Embodiments of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example Random Access Memory (RAM) or FLASH memory embedded in an integrated circuit Central Processing Unit (CPU), network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, some embodiments may be implemented or embodied in computer software (also known as a "computer program" or "code"; we use these terms interchangeably). Programs, or code, are most useful when stored in a digital memory that can be read by one or more digital processors. The term "computer-readable storage medium" (or alternatively, "machine-readable storage medium") includes all of the foregoing types of memory, as well as new technologies that may arise in the future, as long as they are capable of storing digital information in the nature of a computer program or other data, at least temporarily, in such a manner that the stored information can be "read" by an appropriate digital processor. The term "computer-readable" is not intended to limit the phrase to the historical usage of "computer" to imply a complete mainframe, mini-computer, desktop or even laptop computer. Rather, the term refers to a storage medium readable by a digital processor or any digital computing system as broadly defined above. Such media may be any available media that is locally and/or remotely accessible by a computer or processor, and it includes both volatile and nonvolatile media, removable and non-removable media, embedded or discrete.

Having described and illustrated a particular example system, it should be apparent that other systems may be modified in arrangement and detail without departing from the principles described above. Claim is made to all modifications and variations coming within the spirit and scope of the following claims.

The invention claimed is:

1. A storage access system, comprising:
a processor having an associated memory, the processor in communication with a storage media and configured to:
receive data for multiple write operations to the storage media;
aggregate the data into a data block;
identify physical address blocks in the storage media for writing the data block;
identify extra space in one of the physical address blocks; and
store validation information associated with the data block in the extra space.

2. The storage access system of claim 1 wherein the processor is further configured to reserve at least some of the extra space for different sizes of the data received for the write operations.

3. The storage access system of claim 1 wherein the processor is further configured to:
identify an additional one of the physical address blocks more than needed to store the block data; and
store the validation information in the additional one of the physical address blocks.

4. The storage access system of claim 1 wherein the processor is further configured to:
load the data block into the physical address blocks;
identify a last one of the physical address blocks that is unfilled or only partially filled with the data block;
reserve a first portion of the last one of the physical address blocks for overflow data for variable sizes of the data; and
use a second portion of the last one of the physical storage blocks to store the validation information.

5. The storage access system of claim 1 wherein the validation information comprises an address for one of the write operations.

6. The storage access system of claim 1 wherein validation information comprises a write count indicating a number of times the data has been written to the storage media.

* * * * *